(12) United States Patent
Siegenthaler

(10) Patent No.: US 8,459,912 B2
(45) Date of Patent: Jun. 11, 2013

(54) TIE-DOWN HOOK

(75) Inventor: John H. Siegenthaler, Darlington, WI (US)

(73) Assignee: Illinois Tool Works Inc., Glenview, IL (US)

( * ) Notice: Subject to any disclaimer, the term of this patent is extended or adjusted under 35 U.S.C. 154(b) by 822 days.

(21) Appl. No.: 12/397,802

(22) Filed: Mar. 4, 2009

(65) Prior Publication Data

US 2009/0269156 A1    Oct. 29, 2009

Related U.S. Application Data

(60) Provisional application No. 61/047,553, filed on Apr. 24, 2008.

(51) Int. Cl.
*B60P 7/08*         (2006.01)

(52) U.S. Cl.
USPC ............. 410/97; 410/100; 410/101; 410/106; 410/116

(58) Field of Classification Search
USPC ............. 410/96, 97, 100, 101, 102, 104, 106, 410/110, 116, 109, 112; 24/265 CD; 248/499
See application file for complete search history.

(56) References Cited

U.S. PATENT DOCUMENTS 5,416,956 A * 5/1995 Rubin
6,939,095 B1 * 9/2005 Hugg ........................... 410/102

* cited by examiner

*Primary Examiner* — Stephen Gordon
(74) *Attorney, Agent, or Firm* — Mark W. Croll; Paul F. Donovan

(57) ABSTRACT

A hook for a tie-down strap to secure a load on a trailer having a rail engaged by the hook. The hook has first and second panel portions, the first panel portion being secured to the strap. A transition connects the first and second panel portions, and a distal end portion of the second panel portion forms a return segment extending into the space between the panel portions. In use, the first and second panels are disposed along opposite surfaces of the rail. The transition spans one edge of the rail and the return spans an opposite edge of the rail.

18 Claims, 4 Drawing Sheets

TIE-DOWN HOOK

CROSS-REFERENCE TO RELATED APPLICATIONS

The present regular application claims the benefits of U.S. Provisional Application Ser. No. 61/047,553 filed on Apr. 24, 2008.

FIELD OF THE INVENTION

The present invention relates to tie-down devices, and more particularly to hooks used with straps to engage rails on flatbed trailers.

BACKGROUND OF THE INVENTION

Loads on open trailers, such as flatbed trailers, must be adequately secured while in transit so that the load does not move or fall from the trailer. It is known to use straps that span the trailer from one side thereof to the other side thereof drawn tightly against the load on the trailer by a ratcheting load binder or other strap tightening device. Flatbed trailers are know to have rails along the sides of the trailer, held in spaced relation to the trailer edge by spaced pedestals that connect the rail to the bed. A known tie-down system includes a strap having hooks on the ends thereof to engage the rail, and the aforementioned strap tightening device to tighten the strap against the load. The hook is a simple J-hook, and the strap and hook are passed through the space between the rail and the bed so that the hook can engage the bottom of the rail, with the distal end of the hook on the outside of the rail. This allows the strap to be drawn taut without binding or constriction against the rail or trailer bed edge.

A problem with known hook designs is that until the strap is drawn relatively snuggly, or at least held snuggly by the person tightening the strap, the hook can fail to engage the bottom of the rail and a slide upwardly between the rail and trailer. The person tightening the load may have to continually check the hook as the strap is being tightened, or manually provide upward tension on the strap while simultaneously operating the strap tightening device. This can be cumbersome and difficult. Alternatively a second individual can guide the hook to engage the rail, or assist in providing the requisite tension on the strap to ensure that the hook engages the rail. This, of course, is not possible when an individual alone is attempting to install the tie-down straps.

Another problem with known books involves the eyelet in the hook to which the strap is connected. Placement of the eyelet near the end of the hook defines a bar around which strap is engaged. To protect the strap from cutting or wear by the edges of the bar, it is known to surround the bar with an annular sleeve. Installation of the sleeve complicates the manufacturing process and adds cost in the two-piece design, including additional time and steps in the manufacturing process for the hook. Further, if the sleeve becomes damaged, or if the sleeve becomes separated from the bar on which it is installed, premature wear of the strap can be experienced as the strap slides or rubs against raw edges of the eyelet or a damaged portion of the sleeve. Since the strap and hook are often used in difficult environments and subjected to mechanical stress, damage is not uncommon.

Accordingly, there is a need for an improved hook for a tie-down system to facilitate manufacture of the hook, reduce the potential for failure, and facilitate installation and use of the hook and a tie-down system employing the book.

SUMMARY OF THE INVENTION

The present invention provides a hook for a load tie-down system, the hook being of a U-shape to receive the rail therein, with an inwardly direct return tip on the distal end of the hook to engage the top of the rail on a trailer.

In one aspect of one form thereof, the present invention provides a tie-down hook for engaging a rail of a load hauling implement, with first and second opposed panel portions defining a space there between for receiving the rail, and a transition portion connecting the first and second panel portions. The first panel portion having a strap engaging configuration for attaching the tie-down hook to a strap; and a distal end portion of the second panel portion forming a return segment into the space between the panels.

In another aspect of another form a thereof, the present invention provides a tie-down system for securing a load to a load hauling implement. The tie-down system has an elongated web of flexible material and a hook connected to the elongated web. The hook has first and second opposed panel portions defining a space there between, and a transition portion connecting the first and second panel portions at adjacent ends. The first panel portion has a strap engaging configuration for attaching the hook to the strap, and a distal end portion from the second panel portion has a return segment extending into the space between the panel portions, the return segment being spaced from the second panel portion.

In a still further aspect of a still further form thereof, the present invention provides a hook for a tie-down system to secure a load on a trailer having a rail, with first and second opposed panel portions defining a space there between for receiving the rail, and a transition portion connecting the first and second panel portions. The first panel portion has a strap engaging configuration for attaching the hook to a strap. A distal end portion of the second panel portion has a return segment in the space between the first and second panel portions, the second panel portion has an extent between the transition portion and the distal end portion sufficient to span the rail from one edge thereof to an opposite edge thereof, and the return segment defines a space with the second panel sufficient to receive an edge portion of the rail therein.

An advantage of the invention, in at least one form, is providing a robust tie-down hook that can withstand mechanical stresses often experienced in binding loads to trailers.

Another advantage of the invention, in at least one form, is providing a tie-down hook that is easy to install and use.

A further advantage of the invention, in at least one form, is providing a tie-down hook that is easy and cost-effective to manufacture.

Other features and advantages of the invention will become apparent to those skilled in the art upon review of the following detailed description, claims and drawings in which like numerals are used to designate like features.

Figure 1:
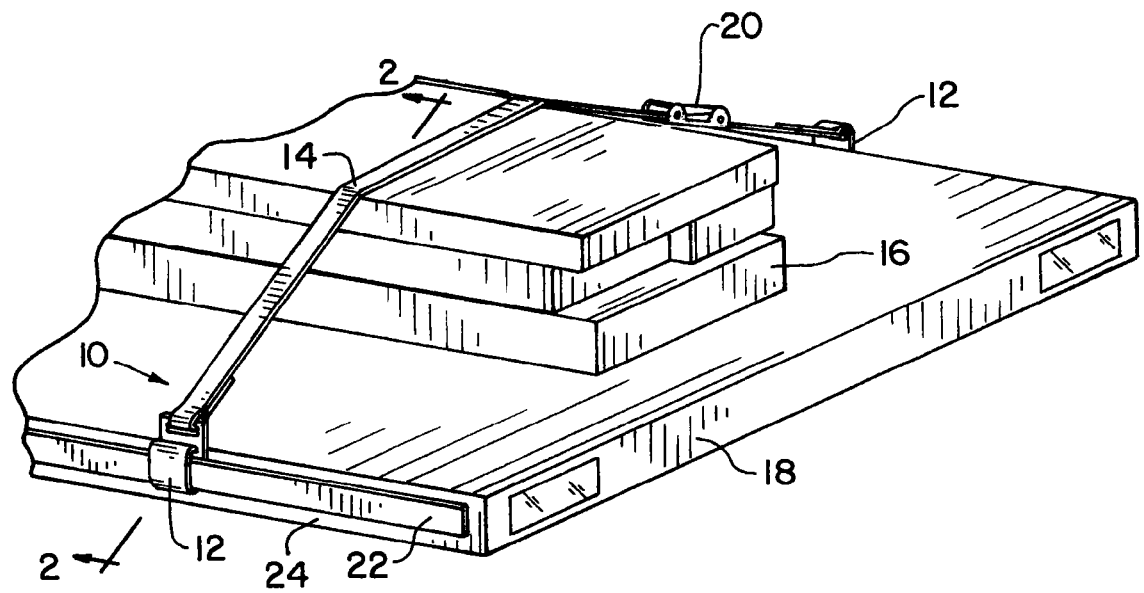
FIG. 1 is a fragmentary perspective view of a flatbed trailer having a tie-down system with tie-down hooks in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a tie-down system 10 is shown having a tie-down hook 12 in accordance with the present invention installed on at least one end of a strap 14, which may be a nylon strap. The present invention can be used with an independent strap having hooks at each end, as shown in the exemplary embodiment of FIG. 1, or can be used on a single free end of a strap in a tie-down system having a strap secured to a ratcheting spool along one side of a trailer and a rail on the opposite side of the trailer to receive the hook.

Tie-down system 10 is shown securing a load 16 on a flatbed trailer 18. Strap 14 spans the trailer from one side thereof to the other side thereof and is drawn tightly against load 16 to secure the load on trailer 18. A strap tightening device 20, such as a load binder or other device is used draw excess length of strap 14 from the portion thereof spanning load 16, to tighten the strap against the load. Suitable strap tightening devices are well-known to those skilled in the art, and strap tightening device 20 will not be described in greater detail herein.

Trailer 18 includes a rail 22 along side edge 24 of the trailer, rail 22 being connected to edge 24 by spaced pedestals 26 connected to edge 24 and rail 22 by welding, mechanical fasteners such as bolts, or other suitable fastening techniques. Rail 22 includes an inside surface 28 and an outside surface 30 between a top edge 32 and a bottom edge 34 of the rail. The present invention can be used on various types of trailers or other load hauling implements having a rail for receiving a hook, and can be used with rails of different types, rail 22 shown and described herein being merely an exemplary embodiment of a suitable installation.

Hook 12 includes a first panel portion 40 and a second panel portion 42 in spaced relation to one another. A transition portion 44 forming a curved bottom of hook 12 interconnects first panel portion 40 and second panel portion 42. First panel portion 40 defines a strap engaging configuration 46 by which hook 12 receives and is connected to strap 14. A distal end portion 48 is provided on second panel portion 42.

Hook 12, including first panel portion 40, second panel portion 42, transition portion 44 and a distal tip portion 48 can be manufactured efficiently of metal by known stamping and a metal forming techniques from a single piece of metal. Accordingly, hook 12 can be provided as a strong, monolithic body requiring no assembly.

In the exemplary embodiment illustrated in the drawings, first panel portion 40 is of sufficient extent to span a distance from transition portion 44 at bottom edge 34 of rail 22 to a position above top edge 32 of rail 22. Strap engaging configuration 46 is provided near an outer edge 50 of first panel portion 40, at a position that is above top edge 32 when hook 12 is installed on rail 22. Strap engaging configuration 46 includes an eyelet 52 defined in first panel portion 40 so as to further define a narrow bar portion 54 between eyelet 52 and outer edge 50. Strap 14 extends through eyelet 52, forming a loop 56 around bar portion 54. Those skilled in the art will readily understand that, in some uses for hook 12, loop 56 can be a fixed formation established through the attachment of strap 14 to itself near bar portion 54 by stitching, adhesive bonding, welding, fastening with rivets, staples or other fasteners or the like. In other uses for hook 12, loop 56 can be a dynamic, changing formation without strap 14 being affixed to itself, so that the strap can be pulled through eyelet 52 such that different segments of strap 14 define the loop 56 at any given adjusted position of strap 14 relative to strap engaging configuration 46.

In the exemplary embodiment, strap engaging configuration 46 has been shown and described as including a single bar portion 54 and a closed eyelet 52. It should be understood that this is merely exemplary, and other structures for attaching strap 14 to hook 12 also can be used. For example, a strap engaging configuration can include a multiple bar formation and/or an eyelet configuration having open ends. The eyelet can be of shapes other than the elongated shape shown in the exemplary embodiment. Features of the present invention can be used advantageously with various hook structures for attaching the hook to the strap.

Eyelet 52 in the illustrated embodiment includes a hem 58, which is a rounded over ridge of material surrounding the periphery of eyelet 52. Hem 58 provides a smooth, rounded edge at the periphery of eyelet 52 to minimize fraying, abrasion or other mechanical disruption of strap 14. Hem 58 can be formed efficiently in a stamping process or other metal forming technique used to create the structure of hook 12.

Second panel portion 42 is of sufficient extent to span the distance between transition portion 44 at bottom edge 34 of rail 22 to distal end portion 48 at top edge 32 of rail 22.

Transition portion 44 interconnects first panel portion 40 with second panel portion 42. Transition portion 44 is a curved formation in hook 12 of sufficient size to extend beneath bottom edge 34 between first panel portion 40 and second panel portion 42 that are on opposite sides of rail 22 when hook 12 is installed. Accordingly, transition portion 44 establishes a spaced relationship between first panel portion 40 and second panel portion 42 of sufficient width to receive rail 22 therein. It should be understood that while transition portion 44 is shown as a smoothly curved formation, other shapes thereof can be used as well. For example, transition portion 44 can include a less curved intermediate segment between two radiused transitions into first panel portion 40 and a second panel portion 42.

Distal end portion 48 is a redirected end transitioning over top edge 32 to provide a distal edge 60 within the space between first panel portion 40 and second panel portion 42. Distal end portion 48 thereby includes a return segment 62 extending into the space between first panel portion 40 and second panel portion 42. Return segment 62 is provided in spaced relationship to an inside surface 64 of second panel portion 42 so that distal end portion 48 can engage top edge 32, with second panel portion 42 on one side of rail 22 and return segment 62 on an opposite side of rail 22.

Figure 2:
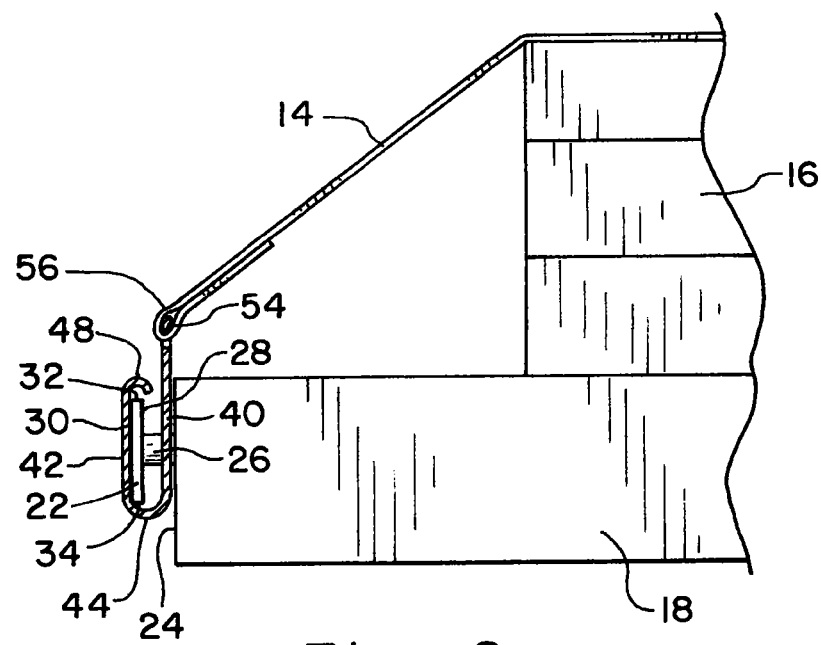
FIG. 2 is a cross-sectional view of a portion of the trailer and tie-down system shown in FIG. 1, taken along line 2-2 of FIG. 1.
Figure 5:
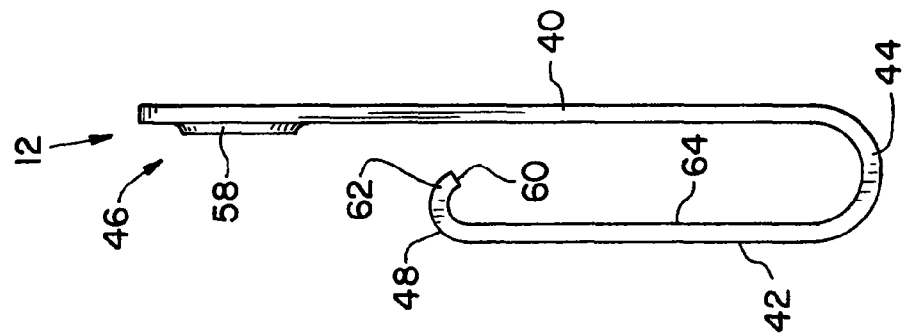
FIG. 5 is a side elevational view of the hook.
Figure 4:
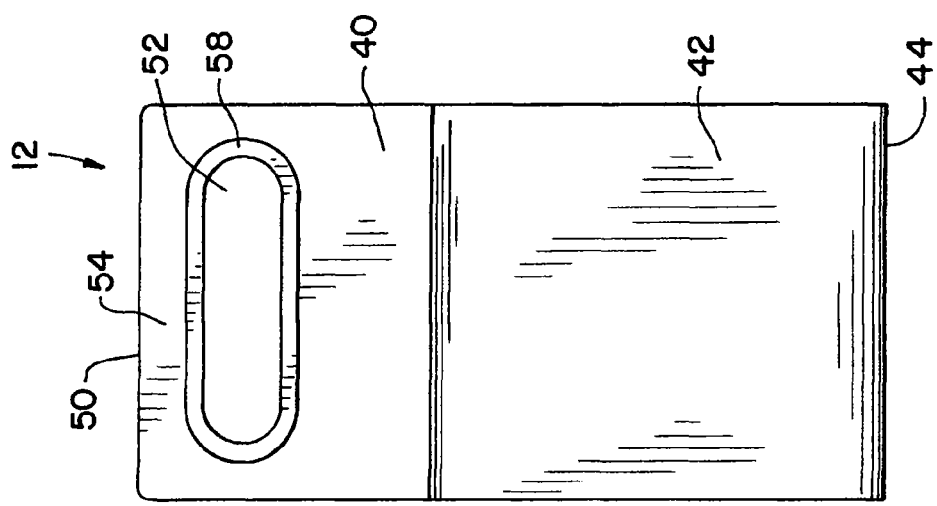
FIG. 4 is an elevational view of the front of the hook as shown in FIG. 3.
Figure 3:
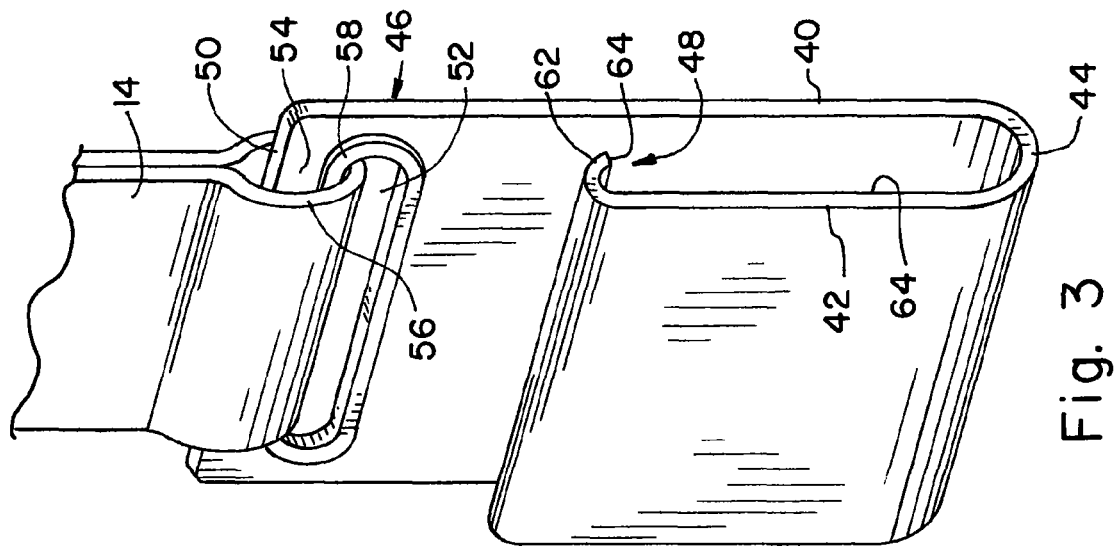
FIG. 3 is a perspective view of a hook in accordance with the present invention having a strap attached thereto.
Figure 6:
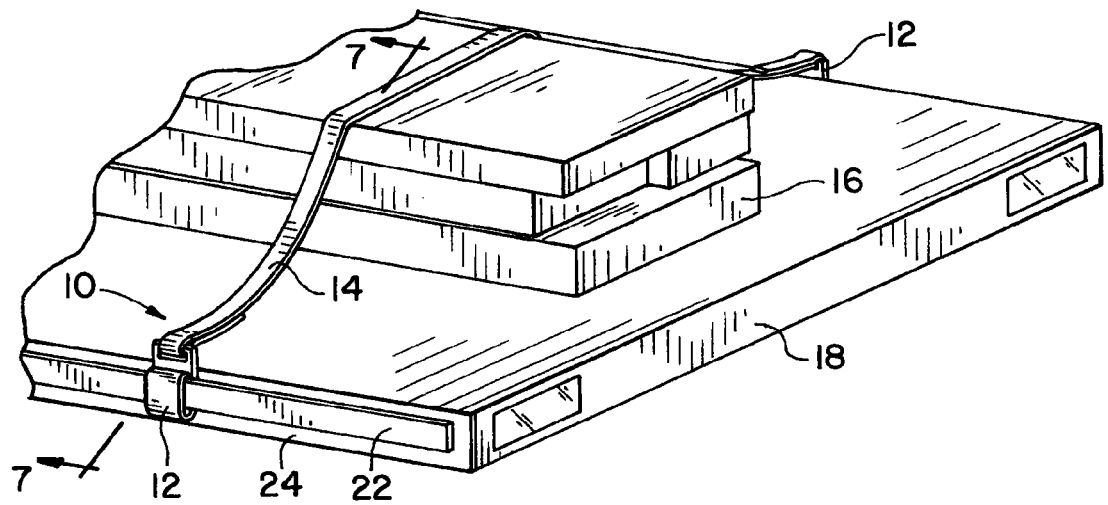
FIG. 6 is a perspective view similar to that of FIG. 1, but illustrating the tie-down strap before tightening.
Figure 7:
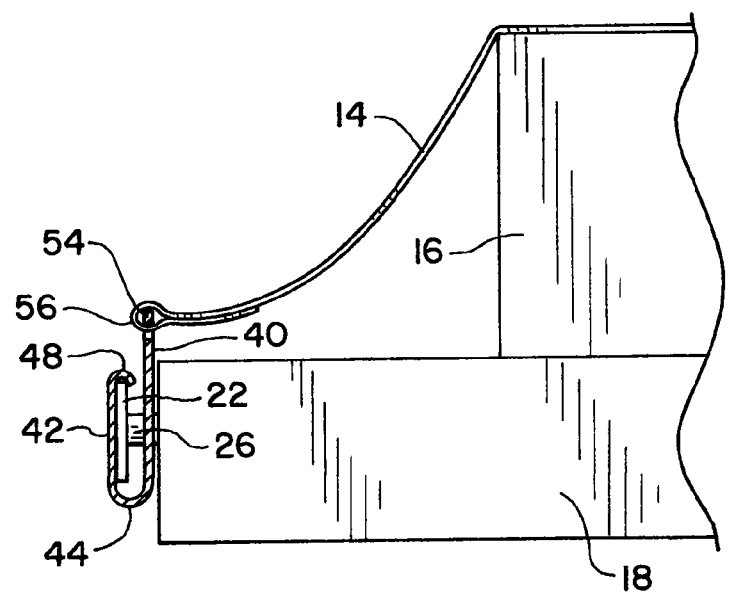
FIG. 7 is a cross-sectional view of the trailer and tie-down system shown in FIG. 6, taken along line 7-7 of FIG. 6.

During installation and use of tie-down system 10, with slack provided in strap 14, before final tightening by strap tightening device 20, hook 12 is retained on rail 22 by distal end portion 48 engaging top edge 32. FIG. 7 illustrates strap 14 in a loosened condition, with distal end portion 48 of hook 12 engaged over top edge 32 of rail 22. Hook 12 remains in position as strap is tightened, even without tension being applied to strap 14. Upon final tightening of strap 14, hook 12 is raised such that distal end portion 48 rises above rail 22 and transition portion 44 engages bottom edge 34, as shown in FIG. 2.

Figure 8:
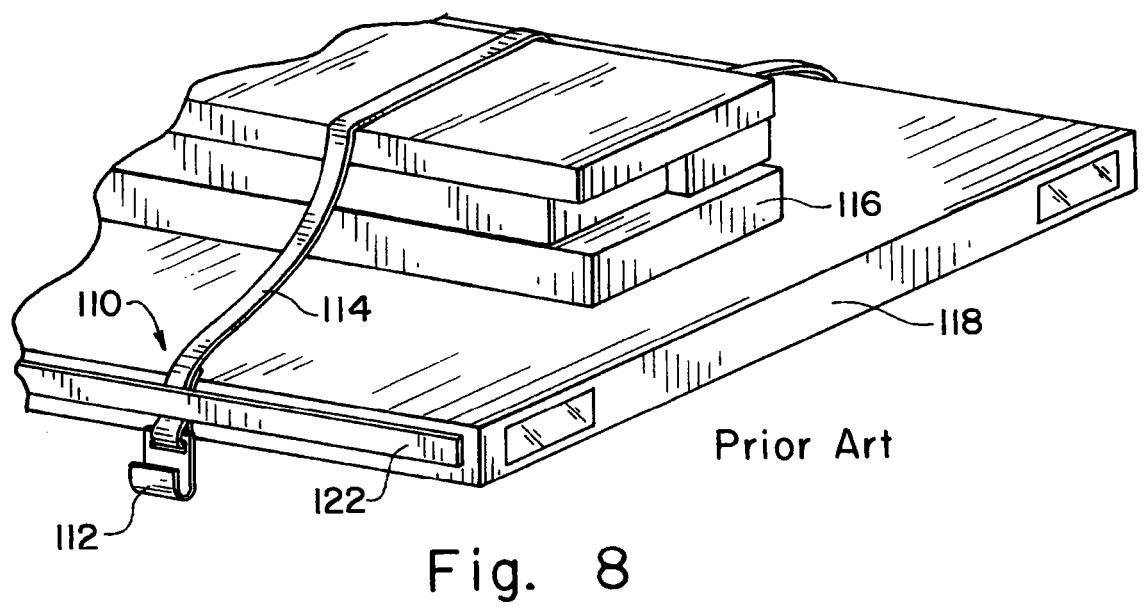
FIG. 8 is a perspective view of a prior art tie-down system before tightening of the strap.

FIG. 8 illustrates a tie-down system 110 of the prior art. A tie-down hook 112 is provided with a strap 114 to secure a load 116 on a trailer 118. Tie-down hook 112 engages a rail 122 when sufficient tension is provided on strap 114. However, as can be seen in FIG. 8, with strap 114 loose, hook 112 dangles below rail 122. As strap 114 is tightened, hook 112 may or may not properly engage rail 122. In contrast to the prior art, hook 12 of the present invention can be positioned to engage rail 22 even when strap 14 is loose. Accordingly, when strap 14 is tightened hook 12 properly engages rail 22 to secure load 16 on trailer 18.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A tie-down hook for engaging a rail of a load hauling implement, said tie-down hook, comprising:
    first and second opposed panel portions defining a space there between for receiving the rail;
    a transition portion connecting said first and second panel portions;
    said first panel portion having a strap engaging configuration for attaching said tie-down hook to a strap; and
    a distal end portion of said second panel portion forming a return segment having a distal edge angled from said second panel portion toward said first panel portion so as to extend into the space between said first and second panel portions, wherein said distal edge of said return segment lies in a first plane and said second panel portion lies in a second plane, such that said first plane is different than said second plane.

2. The tie-down hook of claim 1, said transition portion being a curved base between said first and second panel portions.

3. The tie-down hook of claim 1, said first and second panel portions, said transition portion and said distal end portion being a monolithic body.

4. The tie-down hook of claim 1, said strap engaging configuration being an eyelet near an outer edge of said first panel portion and a bar defined between said eyelet and said outer edge.

5. The tie-down hook of claim 4, said eyelet having a hem at a periphery thereof.

6. The tie-down hook of claim 5, said transition portion being a curved base between said first and second panel portions.

7. The tie-down hook of claim 6, said tie-down hook being a monolithic body.

8. A tie-down system for securing a load to a load hauling implement, said tie-down system comprising:
    an elongated web of flexible material;
    a hook connected to said elongated web;
    said hook having first and second opposed panel portions defining a space there between, and a transition portion connecting said first and second panel portions at adjacent ends;
    said first panel portion having a strap engaging configuration for attaching said hook to said web;
    a distal end portion from said second panel portion having a return segment extending into the space between said panel portions, said return segment being spaced from said second panel portion; and
    said first panel portion defining an eyelet and a bar between said eyelet and an outer edge of said first panel portion, and said web being extended through said eyelet and looped around said bar.

9. The tie-down system of claim 8, said eyelet having a hem at a periphery thereof.

10. The tie-down system of claim 8, said transition portion being a curved base between said first and second panel portions.

11. The tie-down system of claim 10, said eyelet having a hem at a periphery thereof.

12. The tie-down system of claim 10, said first and second panel portions, said transition portion and said distal end portion being a monolithic body.

13. The tie-down system of claim 12, said eyelet having a hem at a periphery thereof.

14. The tie-down system of claim 8, said hook configured for said distal end portion to engage an edge of a rail between said return segment and said second panel portion with said web loose, and for said transition portion to engage an opposite edge of the rail with said web taut.

15. A hook for a tie-down system to secure a load on a trailer having a rail, said hook comprising:
    first and second opposed panel portions defining a space there between for receiving the rail;
    a transition portion connecting said first and second panel portions;
    said first panel portion having a strap engaging configuration for attaching said hook to a strap; and
    a distal end portion of said second panel portion having a return segment in the space between said first and second panel portions, said second panel portion having an extent between said transition portion and said distal end portion sufficient to span the rail from one edge of the rail to an opposite edge of the rail, and said return segment including a distal edge turned inward from said second panel portion toward said first panel portion so as to define a space with said second panel portion sufficient to receive the rail therein.

16. The hook of claim 15, said first and second panel portions, said transition portion and said distal end portion being a monolithic body.

17. The hook of claim 16, said strap engaging configuration including an eyelet defined in said first panel portion.

18. The hook of claim 17, said eyelet defined by a periphery having a hem.

* * * * *